United States Patent
Takeda et al.

(10) Patent No.: US 11,197,270 B2
(45) Date of Patent: Dec. 7, 2021

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Shimpei Yasukawa, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 523 days.

(21) Appl. No.: 16/087,915

(22) PCT Filed: Mar. 22, 2017

(86) PCT No.: PCT/JP2017/011392
§ 371 (c)(1),
(2) Date: Sep. 24, 2018

(87) PCT Pub. No.: WO2017/164222
PCT Pub. Date: Sep. 28, 2017

(65) Prior Publication Data
US 2020/0322925 A1 Oct. 8, 2020

(30) Foreign Application Priority Data
Mar. 25, 2016 (JP) .............................. JP2016-062597

(51) Int. Cl.
*H04W 72/04* (2009.01)
*H04L 27/26* (2006.01)

(52) U.S. Cl.
CPC ......... *H04W 72/04* (2013.01); *H04L 27/2605* (2013.01)

(58) Field of Classification Search
None
See application file for complete search history.

(56) References Cited

U.S. PATENT DOCUMENTS

2008/0095195 A1   4/2008  Ahmadi et al.
2018/0227155 A1*  8/2018  Khoryaev ........... H04L 27/2602

OTHER PUBLICATIONS

Extended European Search Report issued in counterpart European Patent Application No. 17770262.8, dated Mar. 13, 2019 (8 pages).
Nokia Networks; "NB-PUSCH design for NB-IOT"; 3GPP TSG RAN1 NB-IOT adhoc, R1-160008; Budapest, Hungary; Jan. 18-20, 2016 (9 pages).
Lahetkangas, E. et al.; "On the Flexible 5G Dense Deployment Air Interface for Mobile Broadband"; 1st International Conference on 5G for Ubiquitous Connectivity (5GU), Nov. 26, 2014, pp. 57-61 (5 pages).

(Continued)

*Primary Examiner* — James P Duffy
(74) *Attorney, Agent, or Firm* — Osha Bergman Watanabe & Burton LLP

(57) ABSTRACT

The present invention is designed to allow adequate communication in a next generation communication system in which a plurality of numerologies are introduced. A control section that controls communication using at least one of a plurality of numerologies with different subcarrier spacings, and a receiving section that receives information related to numerology for use in communication are provided, and the plurality of numerologies with different subcarrier spacings are configured that one of the length of a transmission time interval (TTI) and the number of symbols per TTI is different.

8 Claims, 18 Drawing Sheets

| | NEW-RAT | | | | |
|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 14/12 | 14/12 | 14/12 | 14/12 |
| TTI-LENGTH | 1ms | 0.5ms | 0.25ms | 0.125ms | 0.0625ms |

(56) References Cited

OTHER PUBLICATIONS

Samsung; "Vision and Schedule for 5G Radio Technologies"; 3GPP RAN Workshop on 5G, RWS-150039; Poenix, AZ, USA; Sep. 17-18, 2015 (20 pages).
Nokia Networks; "Basic system design for UL NB-IoT"; 3GPP TSG-RAN WG1 NB-Iot Adhoc, R1-160041; Budapest, Hungary; Jan. 18-20, 2016 (3 pages).
ZTE; "Consideration on uplink data transmission for NB-IoT"; 3GPP TSG RAN WG1 NB-Iot Meeting #84, R1-160480; St. Julian's, Malta; Feb. 15019, 2016 (14 pages).
ZTE; "Uplink Data Channel with 3.75 kHz Subcarrier Spacing for NB-IoT"; 3GPP TSG RAN WG1 NB-Iot Adhoc Meeting, R1-160054; Budapest, Hungary; Jan. 18-20, 2016 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in PCT/JP2017/011392 dated May 30, 2017 (1 page).
Written Opinion issued in PCT/JP2017/011392 dated May 30, 2017 (4 pages).
Office Action issued in the counterpart Indian Patent Application No. 201817035362, dated May 22, 2021 (8 pages).
Office Action in counterpart Japanese Patent Application No. 2018-507361 dated Mar. 16, 2021 (8 pages).
Intel Corporation; "On benefits of adjusted LTE numerology for V2V communication"; 3GPP TSG RAN WG1 Meeting #84, R1-160429; St Julian's, Malta; Feb. 15-19, 2016 (7 pages).

* cited by examiner

FIG. 3A

| | NEW-RAT | | | | | |
|---|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 14/12 | 14/12 | 14/12 | 14/12 |
| TTI-LENGTH | 1ms | 0.5ms | 0.25ms | 0.125ms | 0.0625ms |

FIG. 3B

| | NEW-RAT | | | | | |
|---|---|---|---|---|---|---|
| SUBCARRIER-SPACING | 18.75kHz | 37.5kHz | 75kHz | 150kHz | 300kHz |
| SYMBOL-LENGTH | 53.33us | 26.67us | 13.33us | 6.67us | 3.33us |
| CP-LENGTH (NORMAL/EXTENDED) | 3.75us/13.33us | 1.88us/6.67us | 1.17us/4.17us | 0.586us/2.083us | 0.293us/1.04us |
| NO. OF SYMBOLS (NORMAL/EXTENDED) | 14/12 | 14/12 | 14/12 | 14/12 | 14/12 |
| TTI-LENGTH | 0.8ms | 0.4ms | 0.2ms | 0.1ms | 0.05ms |

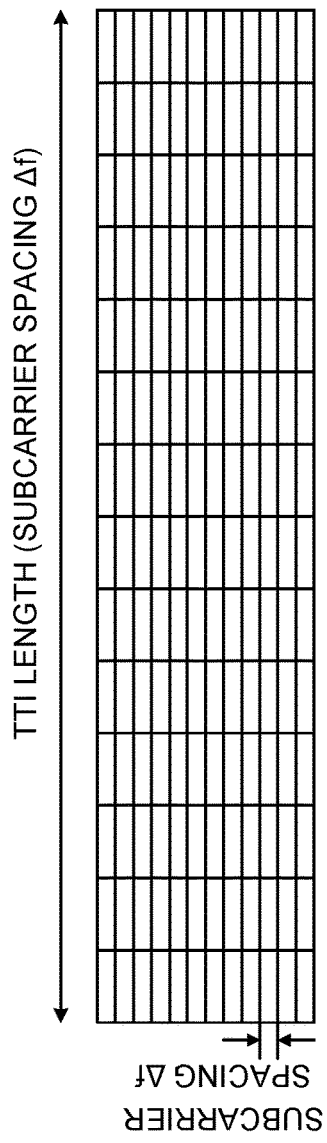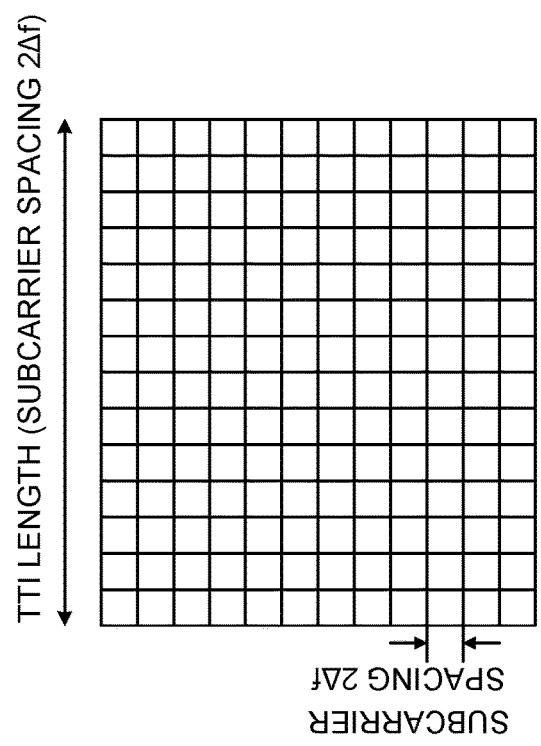
FIG. 4A
FIG. 4B

| | NEW-RAT | | | | |
|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 14/12 | 14/12 | 14/12 | 14/12 |
| TTI-LENGTH | 1ms | 0.5ms | 0.25ms | 0.125ms | 0.0625ms |
| NO. SUBCARRIERS/PRB | 12 | 12 | 12 | 12 | 12 |

FIG. 5

| | NEW-RAT | | | | |
|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 14/12 | 14/12 | 14/12 | 14/12 |
| TTI-LENGTH | 1ms | 0.5ms | 0.25ms | 0.125ms | 0.0625ms |
| NO. SUBCARRIERS/PRB | 12 | 16 / 8 | 20 / 6 | 24 / 4 | 36 / 2 |

| | NEW-RAT | | | | | |
|---|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 28/24 | 56/48 | 112/96 | 224/192 |
| TTI-LENGTH | 1ms | 1ms | 1ms | 1ms | 1ms |

FIG. 7B

| | NEW-RAT | | | | | |
|---|---|---|---|---|---|---|
| SUBCARRIER-SPACING | 18.75kHz | 37.5kHz | 75kHz | 150kHz | 300kHz |
| SYMBOL-LENGTH | 53.33us | 26.67us | 13.33us | 6.67us | 3.33us |
| CP-LENGTH (NORMAL/EXTENDED) | 3.75us/13.33us | 1.88us/6.67us | 1.17us/4.17us | 0.586us/2.083us | 0.293us/1.04us |
| NO. OF SYMBOLS (NORMAL/EXTENDED) | 14/12 | 28/24 | 56/48 | 112/96 | 224/192 |
| TTI-LENGTH | 0.8ms | 0.8ms | 0.8ms | 0.8ms | 0.8ms |

| | NEW-RAT | | | | |
|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 28/24 | 56/48 | 112/96 | 224/192 |
| TTI-LENGTH | 1ms | 1ms | 1ms | 1ms | 1ms |
| NO. SUBCARRIERS/PRB | 12 | 12 | 12 | 12 | 12 |

FIG. 9

| | NEW-RAT | | | | |
|---|---|---|---|---|---|
| SUBCARRIER-SPACING | 15kHz | 30kHz | 60kHz | 120kHz | 240kHz |
| SYMBOL-LENGTH | 66.67us | 33.33us | 16.67us | 8.33us | 4.17us |
| CP-LENGTH (NORMAL/EXTENDED) | 4.7us/16.67us | 2.34us/8.33us | 1.17us/4.17us | 0.586us/2.083us | 0.293us/1.04us |
| NO. OF SYMBOLS (NORMAL/EXTENDED) | 14/12 | 28/24 | 56/48 | 112/96 | 224/192 |
| TTI-LENGTH | 1ms | 1ms | 1ms | 1ms | 1ms |
| NO. SUBCARRIERS/PRB | 12 | 16 / 8 | 20 / 6 | 24 / 4 | 36 / 2 |

| | NEW-RAT | | | | | |
|---|---|---|---|---|---|---|
| SUBCARRIER-SPACING | 15kHz | 30kHz | 60kHz | 120kHz | 240kHz | |
| SYMBOL-LENGTH | 66.67us | 33.33us | 16.67us | 8.33us | 4.17us | |
| CP-LENGTH (NORMAL/EXTENDED) | 4.7us/16.67us | 2.34us/8.33us | 1.17us/4.17us | 0.586us/2.083us | 0.293us/1.04us | |
| NO. OF SYMBOLS (NORMAL/EXTENDED) | 14/12 | 14/12 | 14/12 | 14/12 | 28/24 | |
| TTI-LENGTH | 1ms | 0.5ms | 0.25ms | 0.125ms | 0.125ms | |

FIG. 11B

| | NEW-RAT | | | | | |
|---|---|---|---|---|---|---|
| SUBCARRIER-SPACING | 18.75kHz | 37.5kHz | 75kHz | 150kHz | 300kHz | |
| SYMBOL-LENGTH | 53.33us | 26.67us | 13.33us | 6.67us | 3.33us | |
| CP-LENGTH (NORMAL/EXTENDED) | 3.75us/13.33us | 1.88us/6.67us | 1.17us/4.17us | 0.586us/2.083us | 0.293us/1.04us | |
| NO. OF SYMBOLS (NORMAL/EXTENDED) | 14/12 | 14/12 | 14/12 | 14/12 | 28/24 | |
| TTI-LENGTH | 0.8ms | 0.4ms | 0.2ms | 0.1ms | 0.1ms | |

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). The specifications of LTE-advanced (also referred to as LTE "Rel. 10," "Rel. 11" or "Rel. 12") have been drafted for the purpose of achieving further broadbandization and increased speed beyond LTE (also referred to as "LTE Rel. 8"), and its successor systems (LTE Rel. 13 and later versions) are also under research.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed with different radio base stations are configured in a user terminal, is also introduced. Each cell group is comprised of at least one cell (CC). In DC, multiple CCs of different radio base stations are aggregated, so that DC is also referred to as "inter-eNB CA."

In LTE Rel. 8 to 12, such as described above, the transmission time intervals (TTIs) that are applied to DL transmission and UL transmission between radio base stations and user terminals are configured to 1 ms and controlled. The transmission time intervals are also referred to as "communication time intervals," and TTIs in LTE systems (Rel. 8 to 12) are also referred to as "subframe durations (length)."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

For example, in future radio communication systems (for example, 5G), there is a possibility that communication will be carried out in a high frequency band (for example, several tens of GHz) where it is easier to secure a wide band, or a relatively small amount of data may be communicated as in IoT (Internet of Things), MTC (Machine Type Communication), M2M (Machine To Machine) and so on. Furthermore, the demand for D2D (Device To Device) and V2V (Vehicular To Vehicular) communication, which require low-latency communication, is also increasing.

As described above, unlike conventional radio communication, in 5G, high frequency bands (for example, the 60 to 100 GHz bands) are included in the target carrier frequencies, and study is in progress to design a new communication access scheme (New-RAT (Radio Access Technology)) that covers a wide range of frequency bands from low frequency bands to high frequency bands. Since the propagation path environment and/or the like vary significantly depending on the frequency band, there is a possibility that several different numerologies are introduced in 5G RAT. A "numerology" refers to a set of communication parameters that characterize the design of signals in a given RAT, or the design of the RAT, and so on.

In this case, a user terminal may communicate by selecting a predetermined numerology from a number of numerologies. However, there is no established rule as to how to configure (or design) multiple numerologies. Also, there is no established rule as to how to control communication when multiple numerologies are introduced. Therefore, when communication is carried out using multiple numerologies, a control method whereby this communication can be carried out adequately is required.

The present invention has been made in view of the above, and it is therefore an object of the present invention to provide a user terminal, a radio base station and a radio communication method, whereby communication can be carried out adequately in a next-generation communication system where multiple numerologies are introduced.

Solution to Problem

According to one aspect of the present invention, a user terminal has a control section that controls communication using at least one of a plurality of numerologies with different subcarrier spacings, and a receiving section that receives information related to numerology for use in communication are provided, and, in this user terminal, the plurality of numerologies with different subcarrier spacings are configured that one of the length of a transmission time interval (TTI) and the number of symbols per TTI is different.

Advantageous Effects of Invention

According to the present invention, it is possible to realize adequate communication in a next generation communication system into which a plurality of numerologies are introduced.

BRIEF DESCRIPTION OF DRAWINGS

FIGS. 3A and 3B are diagrams to show examples of configurations of multiple numerologies;

FIGS. 4A and 4B are diagrams to show the relationship between subcarrier spacing and TTI length when TTI length varies;

FIG. 5 is a diagram to show other examples of configurations of multiple numerologies;

FIG. 6 is a diagram to show other examples of configurations of multiple numerologies;

FIGS. 7A and 7B are diagrams to show other examples of configurations of multiple numerologies;

FIG. 9 is a diagram to show other examples of configurations of multiple numerologies;

FIG. 10 is a diagram to show other examples of configurations of multiple numerologies;

FIGS. 11A and 11B are diagrams to show other examples of configurations of multiple numerologies;

DESCRIPTION OF EMBODIMENTS

To provide an access scheme (which may be referred to as "5G RAT," "new RAT," etc.) for use in new future communication systems, an enhanced version of an access scheme used in existing LTE/LTE-A systems (which may be referred to as "LTE RAT," "LTE-based RAT," etc.) is under study.

Figure 1:
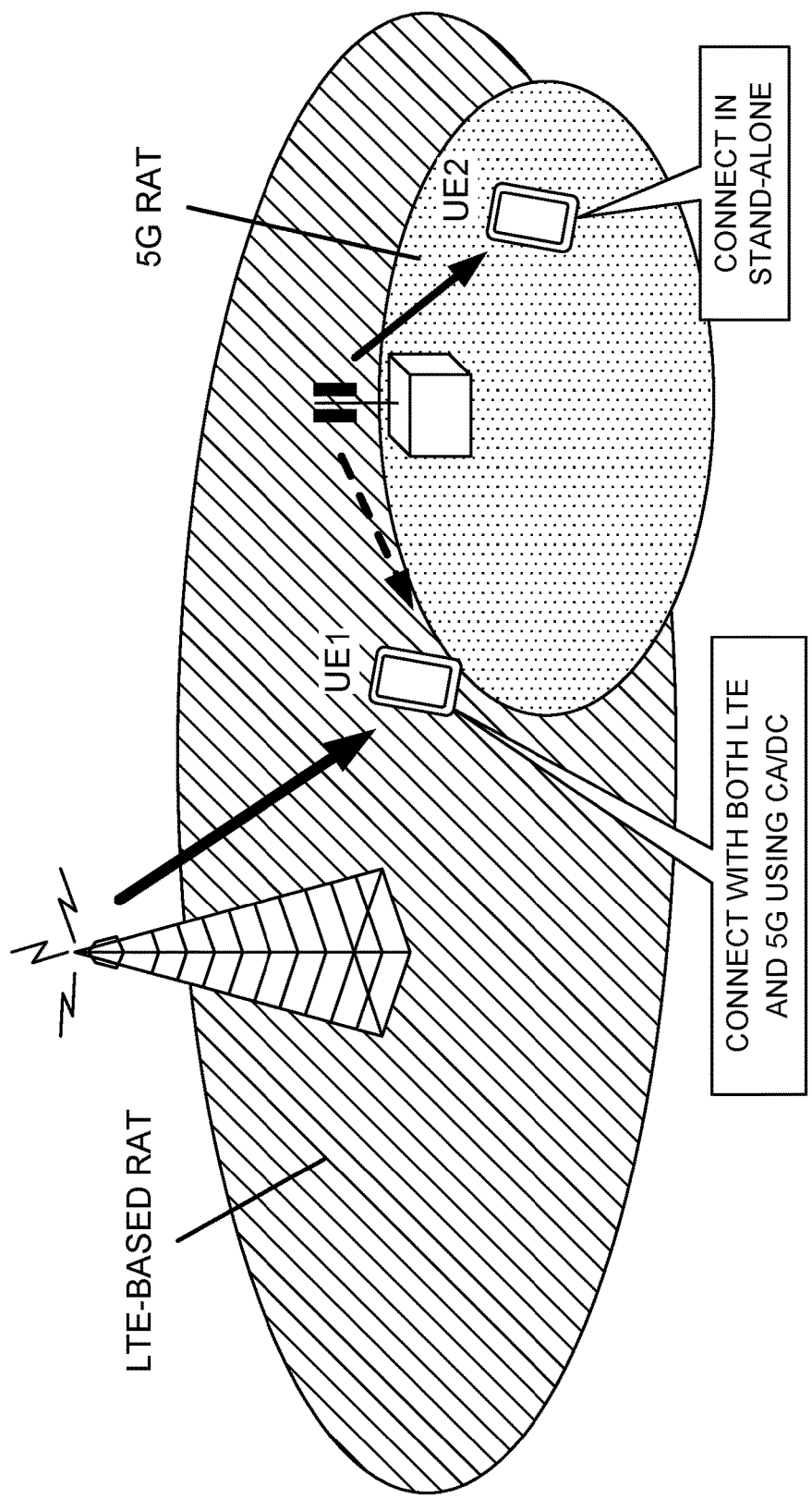
FIG. 1 is a diagram to show examples of modes of operation in a future radio communication system.

A new-RAT cell may be arranged to overlap the coverage of an LTE-RAT cell, or may be arranged independently. FIG. 1 shows a case where a new-RAT cell overlaps the coverage of an LTE-based-RAT cell.

A user terminal (UE 1) can access both the LTE system and the 5G system using carrier aggregation (CA) and/or dual connectivity (DC). In new-RAT, the stand-alone operation may be also possible. "Stand-alone" means that the user terminal operates (camps) independently in new-RAT. In this case, a user terminal (UE 2) can gain initial access to new-RAT.

In new RAT, different radio frames and/or different subframe formats than LTE RAT are under research for use. For example, a radio frame format in which at least one of the subframe length, the symbol length, the subcarrier spacing and the bandwidth is different from existing LTE (LTE Rel. 8 to 12), can be used as a radio frame format for new RAT.

Note that a subframe may be referred to as a "transmission time interval (TTI)." For example, the length of a TTI (subframe) according to LTE Rel. 8 to 12 is 1 ms, comprised of two time slots. A TTI is the time unit for transmitting channel-encoded data packets (transport blocks), and serves as the unit of processing in scheduling, link adaptation, and so on. The subframe length and the TTI length may be configured or defined independent of each other. For example, a structure may be adopted, in which one subframe includes a plurality of TTIs.

Also, communication parameters that are different from LTE-RAT numerologies are applied to new-RAT. Here, a "numerology" refers to a set of communication parameters (radio parameters) that characterize the design of signals in a given RAT, or the design of the RAT, and so on.

Also, when numerologies are different, this means that at least one of following (1) to (6) is different, but the details of numerologies are by no means limited to these:

(1) the subcarrier spacing;
(2) the CP (Cyclic Prefix) length;
(3) the symbol length;
(4) the number of symbols per transmission time interval (TTI);
(5) the TTI length; and
(6) the filtering-process, windowing-process, etc.

As mentioned earlier, new RAT is expected to make a very wide range of frequencies (for example, 1 GHz to 100 GHz) target carrier frequencies. Furthermore, new-RAT is expected to be used in communication for a variety of purposes (services), and to accommodate user terminals that implement various circuit structures/circuit sizes and software. Therefore, there is a possibility that multiple designs (numerologies) with different symbol lengths, subcarrier spacings and so on are supported depending on the requirements that apply to each purpose of use (see FIG. 2).

In order to provide multiple numerologies, for example, it is possible to configure the requirements for enhanced MBB (Enhanced Mobile Broad Band) services, massive MTC (Massive MTC) services, URLLC (Ultra-reliable and low latency communications) services and so on, and define independent numerologies that fulfill these requirements.

Figure 2A:
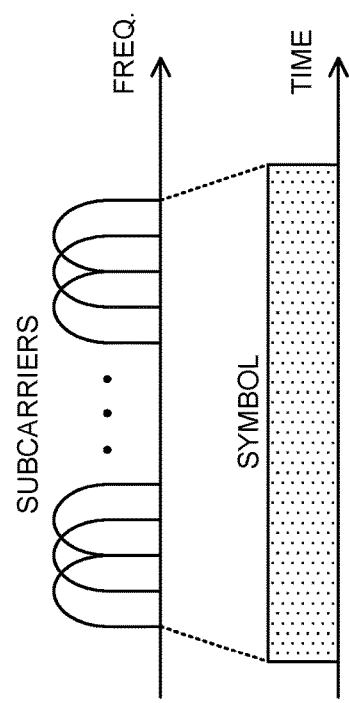
FIGS. 2A to 2C are diagrams to show other examples of modes of operation in a future radio communication system.
Figure 2B:
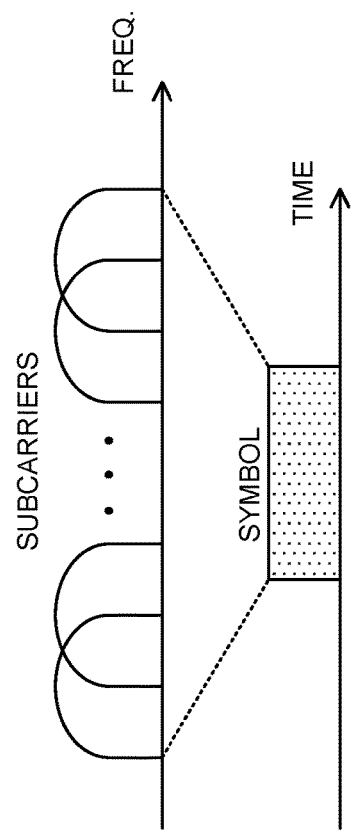
Figure 2C:
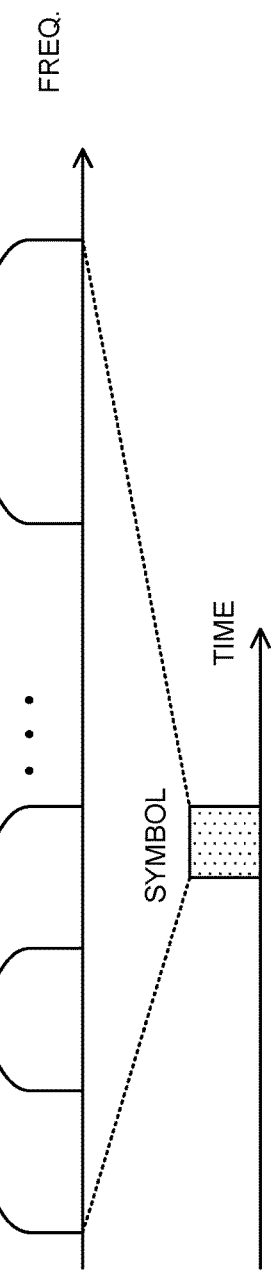

For example, for large-capacity MTC (also referred to as "IoT"), it may be possible to use a numerology that takes into account the narrowing of bands, redundancy and so on, in order to ensure high power efficiency and wide coverage (see FIG. 2A). For enhanced MBB, a numerology that can provide support for overhead reduction, high-order MIMO and so on may be used, so as to achieve high spectral efficiency (see FIG. 2B). For URLLC, a numerology to take into account the shortening of TTIs, quality improvement and so on may be employed to achieve high response performance (see FIG. 2C). Note that the modes of services that are applicable to the present embodiment and the numerologies that apply to each service mode are not limited to these.

In this way, while it is likely that multiple numerologies will be introduced in future communication systems, there is no established rule yet as to how these multiple numerologies are supposed to be configured (or designed). Also, how to control communication between user terminals and radio base stations when a plurality of numerologies (or communication access schemes) are introduced may raise a problem.

Therefore, to provide multiple numerologies, the present inventors have come up with the idea of configuring a different subcarrier spacing in each numerology, and configuring at least one of the TTI length and the number of symbols differently between numerologies with different subcarrier spacings. For example, the TTI length or the number of symbols is configured to vary with the subcarrier spacing in each numerology. Note that the number of symbols indicates the number of symbols per predetermined unit (for example, one TTI).

In addition, assuming that multiple numerologies are configured in a communication system, the present inventors have come up with the idea of allowing a user terminal to identify given numerologies (or communication parameters) to use in communication based on information that is reported in an implicit or an explicit manner. For example, the user terminal may identify the subcarrier spacing and/or the CP length to use in communication based on DL signals. Alternatively, the user terminal may identify the number of subcarriers to use in communication and/or the number of symbols per TTI based on DL signals.

Now, the present embodiment will be described below in detail. Note that the aspects of the present invention which will be described below can be applied to any communication system in which a plurality of numerologies (sets of communication parameters) are configured. In addition, each of the multiple aspects of the present invention described below may be implemented independently, or may be combined as appropriate.

(First Aspect)

In accordance with a first aspect of the present invention, examples of configurations of multiple numerologies will be described. To be more specific, a case in which the TTI length is changed among numerologies with different subcarrier spacings, and a case in which the TTI length is kept the same will be explained.

<When TTI Duration is Changed>

FIG. 3 show examples of configurations of individual numerologies, where the number of symbols is adjusted (made the same) and the TTI length is changed among a number of numerologies with different subcarrier spacings. Here, subcarrier spacing, symbol length, CP length (normal CP/extended CP), the number of symbols (normal CP/extended CP), and TTI length are shown as parameters included in each numerology, but these are not limiting.

In the case shown in FIG. 3A, multiple numerologies are configured by linearly scaling the subcarrier spacing based on an existing LTE numerology (in which the subcarrier spacing is 15 kHz). In the case shown in FIG. 3B, multiple numerologies are configured by linearly scaling subcarrier spacing based on a given new numerology (in which the subcarrier spacing is 18.75 kHz). Obviously, numerologies that can be configured are not limited to these.

FIGS. 3A and 3B show cases where the number of symbols is constant (here, fourteen when normal CPs are used/twelve when extended CPs are used) among numerologies with different subcarrier spacings, and where the TTI length is made shorter as the subcarrier spacing increases.

In this case, assuming that the subcarrier spacing in the first numerology is $\Delta f$, the TTI length in the second numerology, where the subcarrier spacing is twice $\Delta f$ ($2\Delta f$), is half the TTI length of the first numerology (see FIG. 4). FIG. 4A shows the first numerology with subcarrier spacing $\Delta f$, and FIG. 4B shows the second numerology with subcarrier spacing $2\Delta f$.

In this way, by making the number of symbols constant among numerologies with different subcarrier spacings, it is possible to make the number of symbols the same as in existing LTE systems. In this case, even in new numerologies, the signal mapping method (for example, the mapping method for some signals) of LTE systems can be used.

Although FIG. 3 show cases in which the TTI length is scaled linearly based on the subcarrier spacing, the method of configuring the TTI length in each numerology is not limited to this.

Furthermore, in FIG. 3, the number of subcarriers per predetermined radio resource unit (for example, a PRB) may be made constant among the numerologies, regardless of the subcarrier spacing (see FIG. 5). FIG. 5 shows a case where the number of subcarriers per PRB is the same (here, twelve) among numerologies. Note that, although FIG. 5 shows an example of configuring the number of subcarriers in FIG. 3A, the number of subcarriers in FIG. 3B may be configured the same (for example, twelve) among the numerologies.

By making the number of subcarriers per PRB the same in each numerology, the transport block size (TBS) of DL data and/or UL data, which are transmitted based on scheduled PRBs, a rank, a modulation and coding scheme (MCS) and so on, can be made constant irrespective of the subcarrier spacing. By this means, even when multiple numerologies are configured, it is possible to reduce the variation in baseband signal processing, which is required to transmit and receive data, and to reduce the amount of information such as the TBS mapping table that is stored in the memory and so on.

Furthermore, referring to FIG. 3, the number of subcarriers per PRB may be changed depending on the subcarrier spacing in each numerology (see FIG. 6). FIG. 6 shows a case where the number of subcarriers per PRB is increased, or a case where this number is decreased, in accordance with the subcarrier spacing in each numerology.

For example, if the subcarrier spacing is 15 kHz, 30 kHz, 60 kHz, 120 kHz and 240 kHz, the number of subcarriers is increased to 12, 16, 20, 24 and 36, respectively. In other words, a structure can be employed here in which the number of subcarriers per PRB is increased as the subcarrier spacing widens.

Wide subcarrier spacing can heighten the robustness against phase noise and frequency offsets, which increase as the carrier frequency increases, and can be used suitably when the carrier frequency is high. In general, the higher the carrier frequency, the smaller the cell radius and the less the need for multi-user scheduling. In this case, by reducing the granularity of scheduling, it is possible to reduce the number of PRB allocation bits in downlink control information (DCI), and reduce the overhead.

Alternatively, if the subcarrier spacing is 15 kHz, 30 kHz, 60 kHz, 120 kHz and 240 kHz, the number of subcarriers is reduced to 12, 8, 6, 4 and 2, respectively. In other words, a structure can be employed here in which the number of subcarriers per PRB is reduced as the subcarrier spacing widens.

Wide subcarrier spacing (short symbol length) can reduce the impact of channel variations within a symbol period, and therefore can be used effectively when the moving speed of a user terminal is fast. While it is preferable to design a cell that provides support for high-speed movement in a wide cell radius, generally speaking, a wide cell radius is suitable when the carrier frequency is low. When the carrier frequency is low and the cell radius is wide, the necessity of multiuser scheduling increases, and therefore it is desirable to narrow the bandwidth to allocate per user, thereby making it possible to communicate with multiple users at the same time. When a structure to reduce the number of subcarriers as the subcarrier spacing widens is employed, the granularity of scheduling may be increased by reducing the number of subcarriers when the subcarrier spacing is wide, so that, even when the moving speed of a user terminal is fast, it is possible to communicate with multiple users simultaneously, without degrading the quality of communication.

<When TTI Duration is Made Constant>

FIG. 7 show examples of configurations of individual numerologies, where the number of symbols is changed and the TTI length is made constant among a plurality of numerologies with different subcarrier spacings. Here, subcarrier spacing, symbol length, CP length (normal CP/extended CP), the number of symbols (normal CP/extended CP), and TTI length are shown as parameters included in each numerology, but these are not limiting.

In the case shown in FIG. 7A, multiple numerologies are configured by linearly scaling the subcarrier spacing based on an existing LTE numerology (in which the subcarrier spacing is 15 kHz). In the case shown in FIG. 7B, multiple numerologies are configured by linearly scaling the subcarrier spacing based on a given new numerology (in which the subcarrier spacing is 18.75 kHz). Obviously, numerologies that can be configured are not limited to these.

FIGS. 7A and 7B show cases where the TTI length is constant (here, 1 ms) among numerologies with different subcarrier spacings, and where the number of symbols is increased as the subcarrier spacing increases.

Figure 8A:
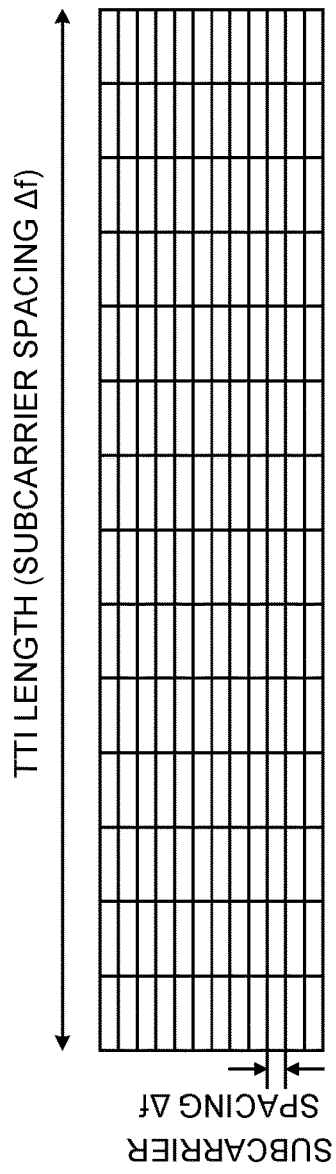
FIGS. 8A and 8B are diagrams to show the relationship between subcarrier spacing and TTI length when TTI length is constant.
Figure 8B:
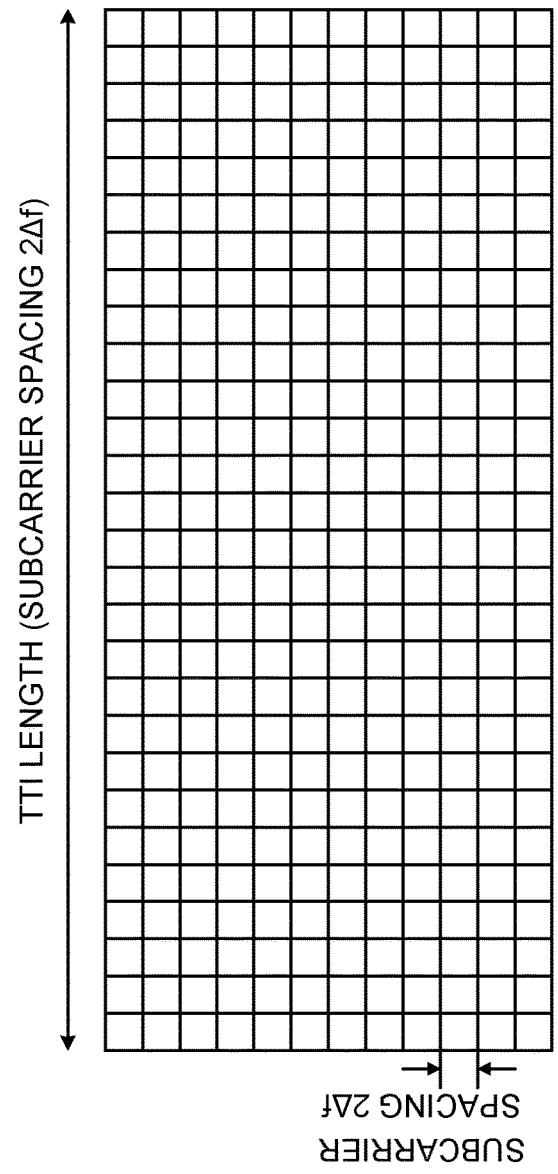

In this case, if subcarrier spacing in the first numerology is $\Delta f$, the number of symbols in the second numerology, where the subcarrier spacing is twice $\Delta f$ ($2\Delta f$), is twice the number of symbols in the first numerology (see FIG. 8). FIG. 8A shows a first numerology with subcarrier spacing $\Delta f$, and FIG. 8B shows the second numerology with subcarrier spacing $2\Delta f$.

In this way, by making the TTI length constant among numerologies with different subcarrier spacings, it is possible to establish timing synchronization among cells of varying numerologies that operate in different frequencies. Since timing synchronization can be easily established by combining arbitrary frequencies, TDD carriers that use different numerologies, even when run in adjacent frequencies, can communicate without interferer ring with one another. In addition, when carrier aggregation and dual connectivity to use cells of different numerologies that operate in different frequencies are executed with respect to a single user terminal, given that the timing of TTIs is synchronized, it is possible to simplify the control, implementations and so on of transmission and receipt.

Although FIG. 7 show cases in which the number of symbols per TTI is scaled linearly based on the subcarrier spacing, the method of configuring the number of symbols in each numerology is not limited to this.

Furthermore, in FIG. 7, the number of subcarriers per predetermined radio resource unit (for example, a PRB) may be made constant among the numerologies, regardless of the subcarrier spacing (see FIG. 9). FIG. 9 shows a case where the number of subcarriers per PRB is the same (here, twelve) among numerologies. Note that, although FIG. 9 shows an example of configuring the number of subcarriers in FIG. 7A, the number of subcarriers in FIG. 7B may be configured the same (for example, twelve) among the numerologies.

When the number of subcarriers per PRB is made the same among numerologies, the number of resource elements (REs) per PRB (per TTI) varies among numerologies with different subcarrier spacings. In this case, the number of resource elements per PRB changes in proportion to the number of OFDM symbols, so that a structure may be employed here in which the TBS of DL data and/or UL data, which are transmitted based on scheduled PRBs, a rank, an MCS and so on, can be changed (made proportional, for example) depending on the subcarrier spacing.

By this means, even when multiple numerologies are configured, it is possible to reduce the variation in baseband signal processing, which is required to transmit and receive data, and to reduce the amount of information, such as, for example, the TBS mapping table that is stored in the memory.

Furthermore, referring to FIG. 7, the number of subcarriers per PRB may be changed depending on the subcarrier spacing in each numerology (see FIG. 10). FIG. 10 shows a case where the number of subcarriers per PRB is increased, or a case where this number is decreased, in accordance with the subcarrier spacing in each numerology.

For example, if the subcarrier spacing is 15 kHz, 30 kHz, 60 kHz, 120 kHz and 240 kHz, the number of subcarriers is increased to 12, 16, 20, 24 and 36, respectively. In other words, a structure can be employed here in which the number of subcarriers per PRB is increased as the subcarrier spacing widens.

Wide subcarrier spacing can heighten the robustness against phase noise and frequency offsets, which increase as the carrier frequency increases, and can be used suitably when the carrier frequency is high. In general, the higher the carrier frequency, the smaller the cell radius and the less the need for multi-user scheduling. In this case, by reducing the granularity of scheduling, it is possible to reduce the number of PRB allocation bits in downlink control information (DCI), and reduce the overhead.

Alternatively, if the subcarrier spacing is 15 kHz, 30 kHz, 60 kHz, 120 kHz and 240 kHz, the number of subcarriers is reduced to 12, 8, 6, 4 and 2, respectively. In other words, a structure can be employed here in which the number of subcarriers per PRB is reduced as the subcarrier spacing widens.

Wide subcarrier spacing (short symbol length) can reduce the impact of channel variations within a symbol period, and therefore can be used effectively when the moving speed of a user terminal is fast. While it is preferable to design a cell that provides support for high-speed movement in a wide cell radius, generally speaking, a wide cell radius is suitable when the carrier frequency is low. When the carrier frequency is low and the cell radius is wide, the necessity of multiuser scheduling increases, and therefore it is desirable to narrow the bandwidth to allocate per user, thereby making it possible to communicate with multiple users at the same time. When a structure to reduce the number of subcarriers as the subcarrier spacing widens is employed, the granularity of scheduling may be increased by reducing the number of subcarriers when the subcarrier spacing is wide, so that, even when the moving speed of a user terminal is fast, it is possible to communicate with multiple users simultaneously, without degrading the quality of communication.

Alternative Examples

A structure may be adopted here in which the scaling of TTI length (or the number of symbols) among a plurality of numerologies with different subcarrier spacings is applied up to a predetermined subcarrier spacing. For example, the TTI length may be scaled (to make the number of symbols constant) based on the subcarrier spacing until the subcarrier spacing reaches a predetermined value, and the TTI length may be made constant (to scale the number of symbols) when the subcarrier spacing is equal to or greater than the predetermined value (see FIG. 11).

FIG. 11A shows a case where the subcarrier spacing is scaled linearly based on an existing LTE numerology, and FIG. 11B shows a case where the subcarrier spacing is scaled linearly with respect to a certain new numerology.

In FIGS. 11A and 11B, the number of symbols is kept constant among the numerologies in which the subcarrier spacing less than 120 kHz, and the TTI length is shortened as the subcarrier spacing increases. In addition, the TTI length is made constant among the numerologies in which the subcarrier spacing is 120 kHz or greater, and the number of symbols is increased as the subcarrier spacing increases.

By this means, even when the subcarrier spacing increases, the TTI length can be made equal to or greater than a predetermined value. By this means, it is possible to prevent the TTI length from becoming too short, and prevent the processing load that is produced in user terminals (or base stations) from increasing. Also, given that the ratio of DCI and reference signals to the number of resource elements (REs) can be made smaller by fixing the TTI length, by making the TTI length fixed when the TTI length is sufficiently small, it is possible to reduce the overhead while keeping the latency sufficiently low.

(Second Aspect)

In accordance with a second aspect of the present invention, the method by which a user terminal communicates when a plurality of numerologies are configured in a communication system will be described.

A user terminal can identify information (for example, communication parameters) related to predetermined numerologies for use in communication, based on information that is reported in an implicit and/or an explicit manner. For example, the user terminal identifies the subcarrier spacing and/or the CP length to use in communication based on a DL signal.

As for the information (for example, a DL signal) that is reported in an implicit manner here, information that is defined in advance based on the band index and/or the bandwidth can be used. Alternatively, the information (for example, the locations of mapped resources, signal sequences, etc.) that is obtained as a result of performing the receiving process (for example, blind decoding) of synchronization signals (SS) and/or reference signals (RS) may be used as the information to be provided via implicit reporting. For example, the user terminal can determine the subcarrier spacing and/or the CP length based on in which resource locations synchronization signals and/or reference signals are received.

As for the information that is reported in an explicit manner, it is possible to use broadcast information, system information, information that is indicated in a specific field in RRC signaling, and so on.

Also, the user terminal can learn the number of subcarriers per PRB and/or the number of symbols per TTI, from information (such as DL signals) that is reported in an implicit and/or an explicit manner.

In this way, the user terminal acquires information related to numerologies for use in communication, from DL signals, so that the user terminal can select predetermined numerologies and communicate properly in a communication system where multiple numerologies are configured.

Note that the user terminal may report information related to the numerologies with which the user terminal is capable of transmission and receipt, to the base station, in advance, as terminal capability information. This terminal capability information may be reported using LTE numerologies in an LTE carrier, or may be reported using a specific numerology in a new-RAT carrier.

Regarding this terminal capability information, for example, combinations of parameters such as the subcarrier spacing, the CP length, the number of symbols, the TTI length, and so on may be defined with separate numerology indices, and so that the user terminal may report the index of the numerology that can be configured in the user terminal, or report the subcarrier spacing or the symbol length, the CP length, the number of symbols or the TTI length and so on separately. In the former case, the signaling overhead required to report the terminal capability information can be reduced. In the latter case, it is possible to report combinations of numerologies that enable more flexible transmission and receipt.

Also, the terminal capability information may be independently reported for the downlink and for the uplink. In this case, different numerologies can be configured between the uplink and the downlink, which allows an implementation that can suppress the increase in the terminal circuit scale. Also, the terminal capability information may vary depending on, for example, the carrier frequency, the system bandwidth, the number of MIMO layers and the number of component carriers (CCs) that communicate simultaneously using carrier aggregation and so on. In this case, the user terminal does not need to use all the numerologies in all environments, and only needs to implement numerologies that are likely to be used in reality, so that it is possible to suppress an increase in the terminal circuit scale and realize a cheaper and smaller terminal.

<Method of Communicating Based on Predetermined Numerology>

When multiple numerologies can be configured in a communication system, how to determine the transport block size (TBS), the arrangement of reference signals (RSs) and so on in each numerology is the problem. Therefore, the present embodiment provides methods for solving this problem, including a method in which a TBS table and/or an RS arrangement are defined in each numerology (method 1), and a method in which a predetermined TBS table and/or an RS arrangement are scaled (corrected) and defined in common among a plurality of numerologies (method 2).

(Method 1)

Figure 12A:
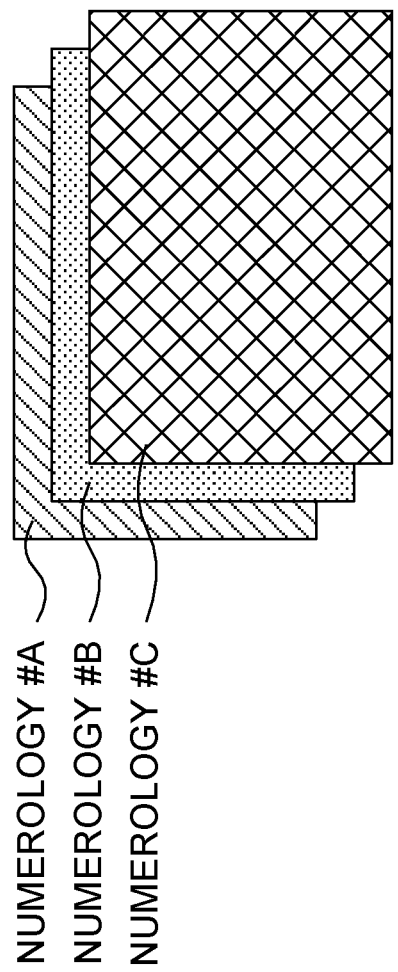
FIGS. 12A and 12B are diagrams to show examples of TBS tables to apply to multiple numerologies.

In method 1, a user terminal (and a radio base station) communicates based on the specifications of DL/UL control channels, DL/UL data channels and so on, defined per numerology. To be more specific, a TBS table and/or an RS arrangement that are associated with each numerology, are defined (see FIG. 12A). FIG. 12A shows a case in which a TBS table is defined for each of a plurality of numerologies (here numerologies # A, # B and # C).

The user terminal can control the transmission and receipt of data by selecting different TBS tables depending on the subcarrier spacing, the number of subcarriers per PRB and/or the number of symbols per TTI. For example, when the user terminal identifies the numerology to use in communication based on a DL signal and so on, the user terminal uses the TBS table corresponding to that numerology.

In addition, the user terminal performs channel estimation and/or the like for DL/UL control channels and DL/UL data channels by using an RS arrangement that is defined in accordance with the subcarrier spacing, the number of subcarriers per PRB and the number of symbols per TTI.

In this way, by controlling communication based on TBS tables and RS arrangements that are defined on a per numerology basis, it is possible to accommodate each individual numerology by using an optimal TBS table and an RS arrangement, and, consequently, improve the quality of communication.

(Method 2)

Figure 12B:
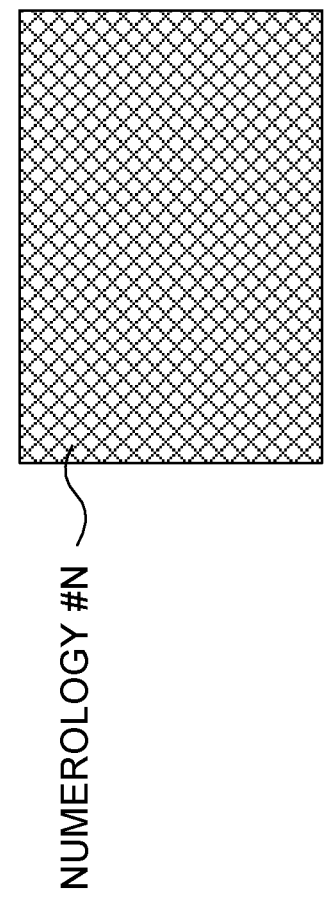

In method 2, a user terminal (and a radio base station) communicates by scaling (correcting) the specifications of DL/UL control channels and DL/UL data channels defined for a numerology that serve as a base (reference numerology), depending on the numerology to be used. To be more specific, a TBS table and/or an RS arrangement to be associated with a reference numerology are defined (see FIG. 12B). FIG. 12B shows a case where a TBS table is defined for a reference numerology (here, numerology # N).

The user terminal communicates using the values that are determined by scaling the values provided in the reference TBS table (see FIG. 12B) based on the subcarrier spacing, the number of subcarriers per PRB and/or the number of symbols per TTI, in accordance with the subcarrier spacing, the number of subcarriers and/or the number of symbols that are actually used in communication.

Also, from the reference RS arrangement that is defined based on the subcarrier spacing, the number of subcarriers per PRB and/or the number of symbols per TTI, the user terminal determines the RS arrangement in accordance with the subcarrier spacing, the number of subcarriers and/or the number of symbols that are actually used in communication, and controls transmission and receipt therewith. For example, the user terminal receives reference signals in an RS arrangement that is derived from the reference RS arrangement, based on the subcarrier spacing, the number of subcarriers and/or the number of symbols that are actually used in communication, by using a linear equation. For the linear equation, it is possible to use an equation that makes the RS density per unit time/unit frequency constant.

In this way, a reference TBS table and/or RS arrangement are configured for a plurality of numerologies, and corrected depending on the numerology to be used and communication is carried out accordingly, eliminating the need for configure multiple TBS tables and RS arrangements. Thus, it is possible to reduce the amount of information such as the TBS mapping table stored in the memory, and so on.

Alternative Examples

Also, the user terminal (and the radio base station) may communicate based on specifications of DL/UL control channels, DL/UL data channels and so on that are independent of numerologies. In this case, it is possible to define a TBS table in accordance with the number of REs, and/or define one type of RS arrangement in time/frequency.

For example, the user terminal transmits/receives data by applying a TBS table, which is defined according to the number of REs, to an arbitrary subcarrier spacing, an arbitrary number of subcarriers per PRB and/or an arbitrary number of symbols per TTI.

Also, the user terminal transmits/receives reference signals by applying one kind of RS arrangement, which is defined in time/frequency, to an arbitrary subcarrier spacing, an arbitrary number of subcarriers per PRB and/or an arbitrary number of symbols per TTI.

By communicating based on specifications of DL/UL control channels, DL/UL data channels and so on that are independent of numerologies, it is not necessary to configure multiple patterns of TBS tables and RS arrangements. By this means, it is possible to reduce the amount of information such as the TBS mapping table stored in the memory and so on.

(Radio Communication System)

Now, the structure of a radio communication system according to one embodiment of the present invention will be described below. In this radio communication system, the radio communication method according to one and/or a combination of the above-described embodiments of the present invention is employed.

Figure 13:
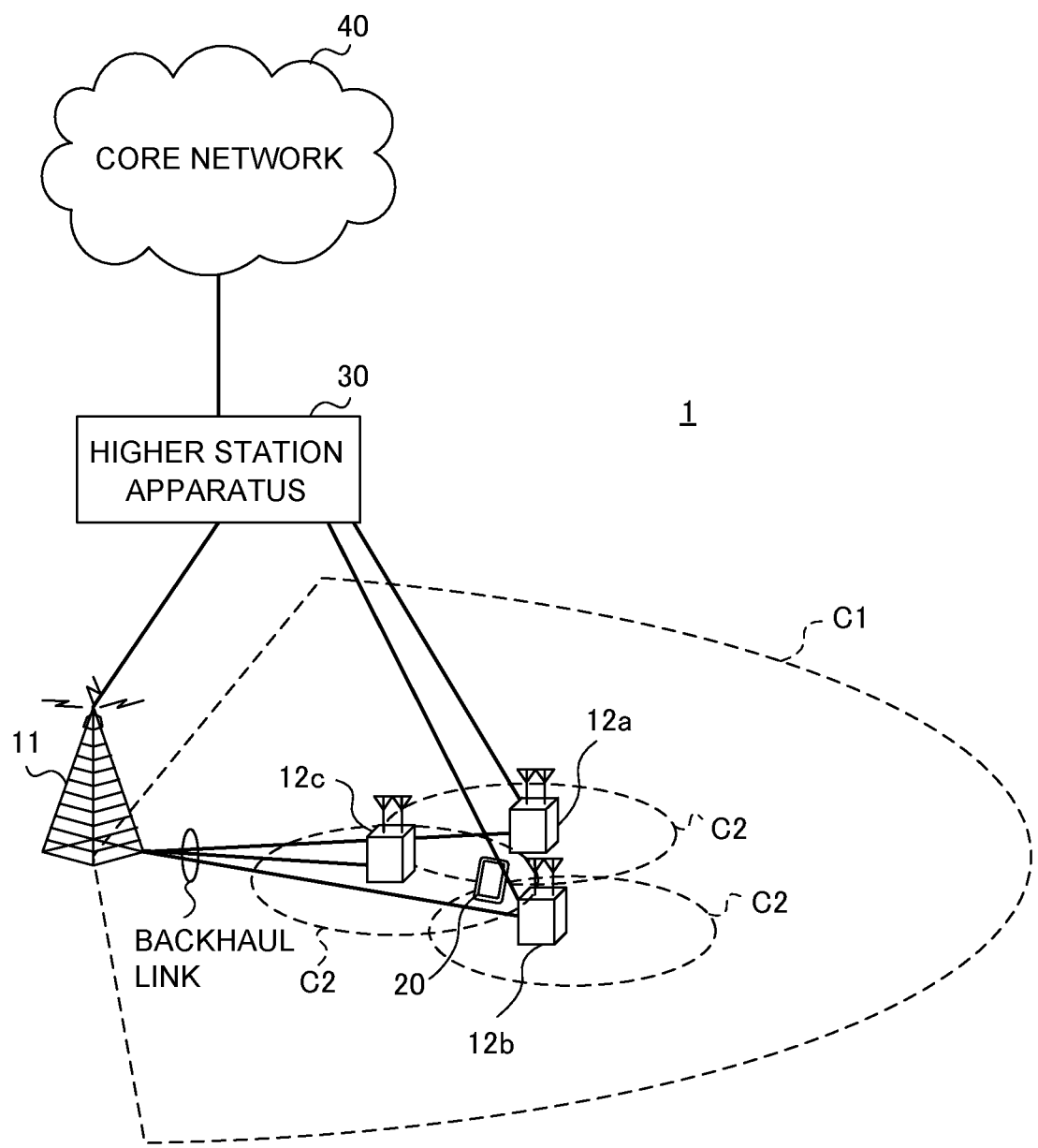
FIG. 13 is a diagram to show an example of a schematic structure of a radio communication system according to present embodiment.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 is may be referred to as "LTE (Long Term Evolution)," "LTE-A (LTE-Advanced)," "LTE-B (LTE-Beyond)," "SUPER 3 G," "IMT-Advanced," "4G (4th generation mobile communication system)," "5G (5th generation mobile communication system)," "FRA (Future Radio Access)," "new RAT (Radio Access Technology)" and so on, or may be seen as a system to implement these.

The radio communication system 1 shown in FIG. 13 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier (for example, a 5G RAT carrier) of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Furthermore, uplink control information (UCI) to include at least one of downlink radio quality information (CQI: Channel Quality Indicator), delivery acknowledgment information and so on is communicated through the PUCCH. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 14:
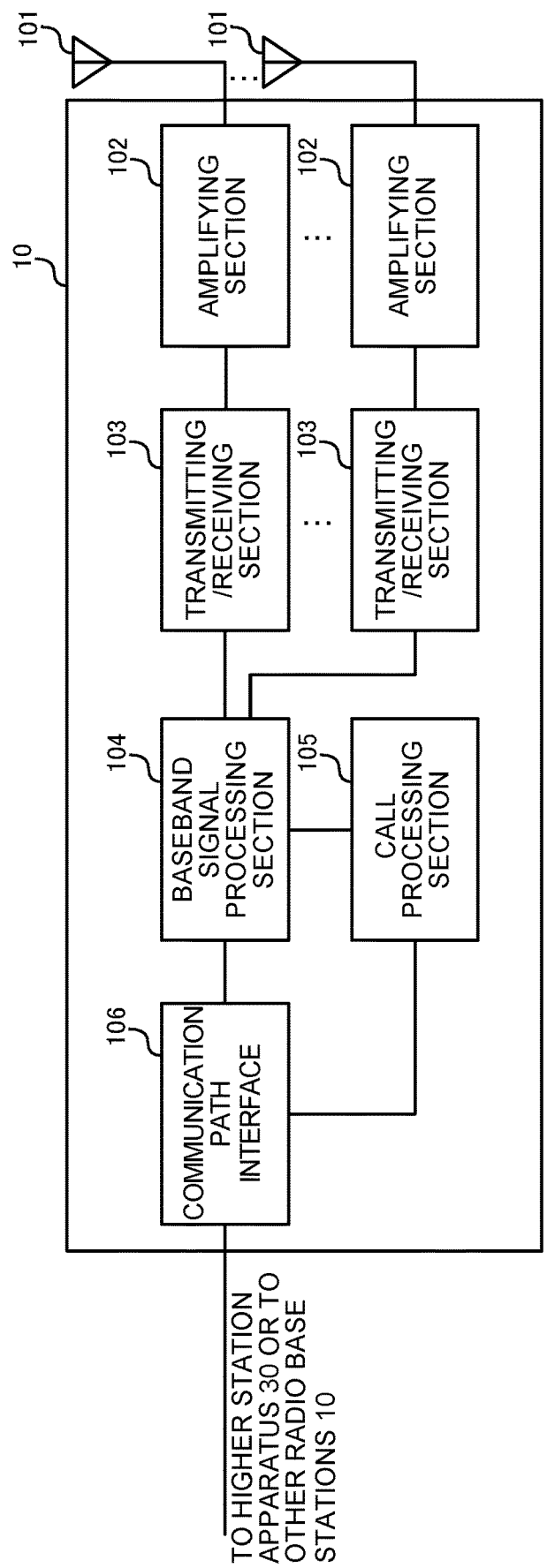
FIG. 14 is a diagram to show an example of an overall structure of a radio base station according to present embodiment.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section. The transmitting/receiving sections 103 transmit, for example, the synchronization signals or the broadcast signal to the user terminal 20.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit information related to numerologies which the user terminals use in communication. For example, the transmitting/receiving sections 103 report information (for example, communication parameters) related to predetermined numerologies that are used in communication, to the user terminals, in an implicit and/or an explicit manner.

Figure 15:
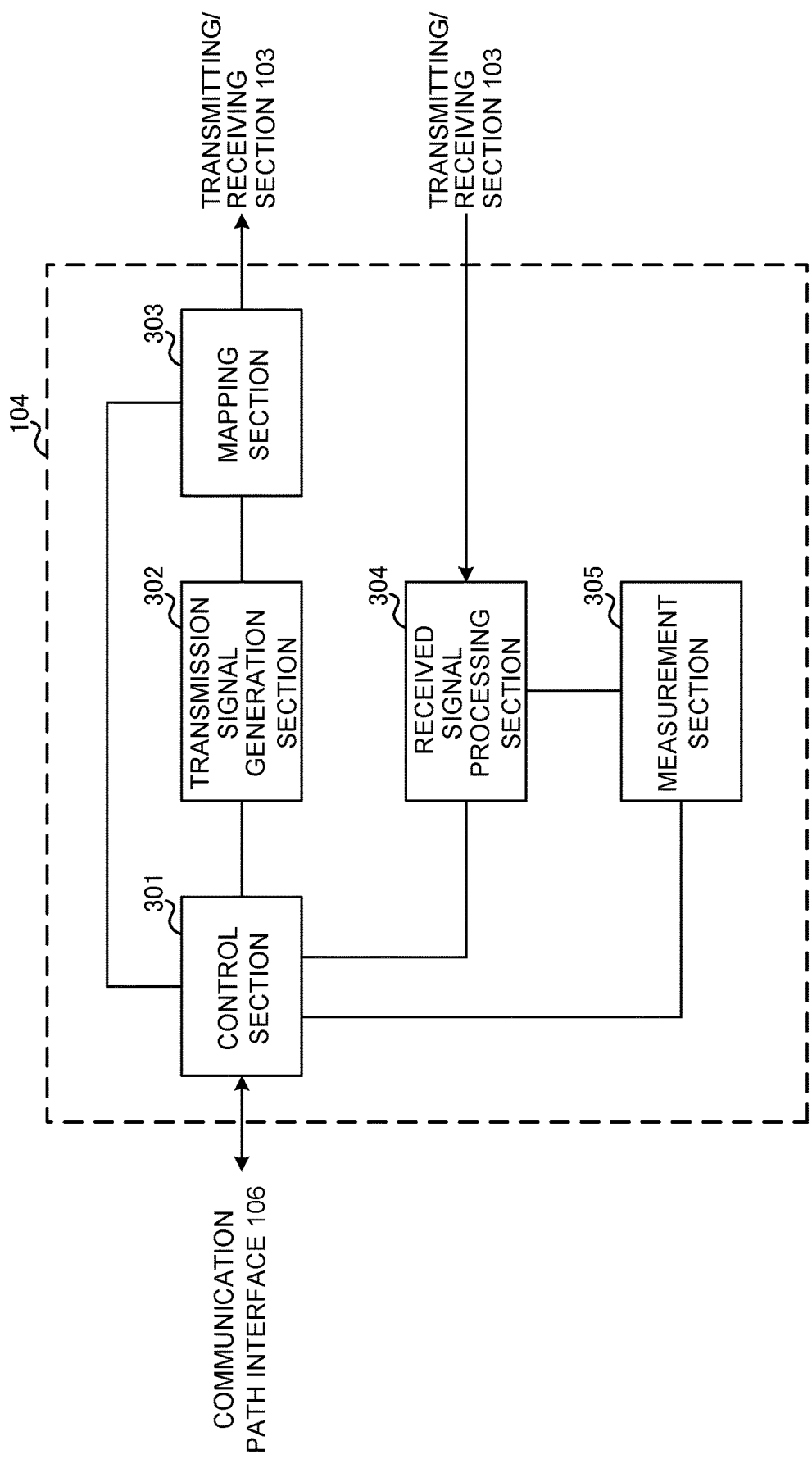
FIG. 15 is a diagram to show an example of a functional structure of a radio base station according to present embodiment.

FIG. 15 is a diagram to show an example of a functional structure of a radio base station according to one embodiment of the present invention. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 at least has a control section (scheduler) 301, a transmission signal generating section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

In particular, the control section 301 controls the radio base station 10 to communicate by using a predetermined radio access scheme (for example, LTE RAT, 5G RAT, etc.). The control section 301 exerts control so that signals are transmitted and received according to the numerology that applies to the radio access scheme used for communication.

The control section 301 controls communication with the user terminals by using at least one of a plurality of numerologies having different subcarrier spacing. These multiple numerologies can be configured so that the subcarrier spacing varies and either the length of transmission time intervals (TTIs) or the number of symbols per TTI varies.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure, for example, the received power (for example, RSRP (Reference Signal Received Power)), the received signal strength (for example, RSSI (Received Signal Strength Indicator)), the received quality (for example, RSRQ (Reference Signal Received Quality)), the channel state, and so on, of the received signal. The measurement results may be output to the control section 301.

(User Terminal)

Figure 16:
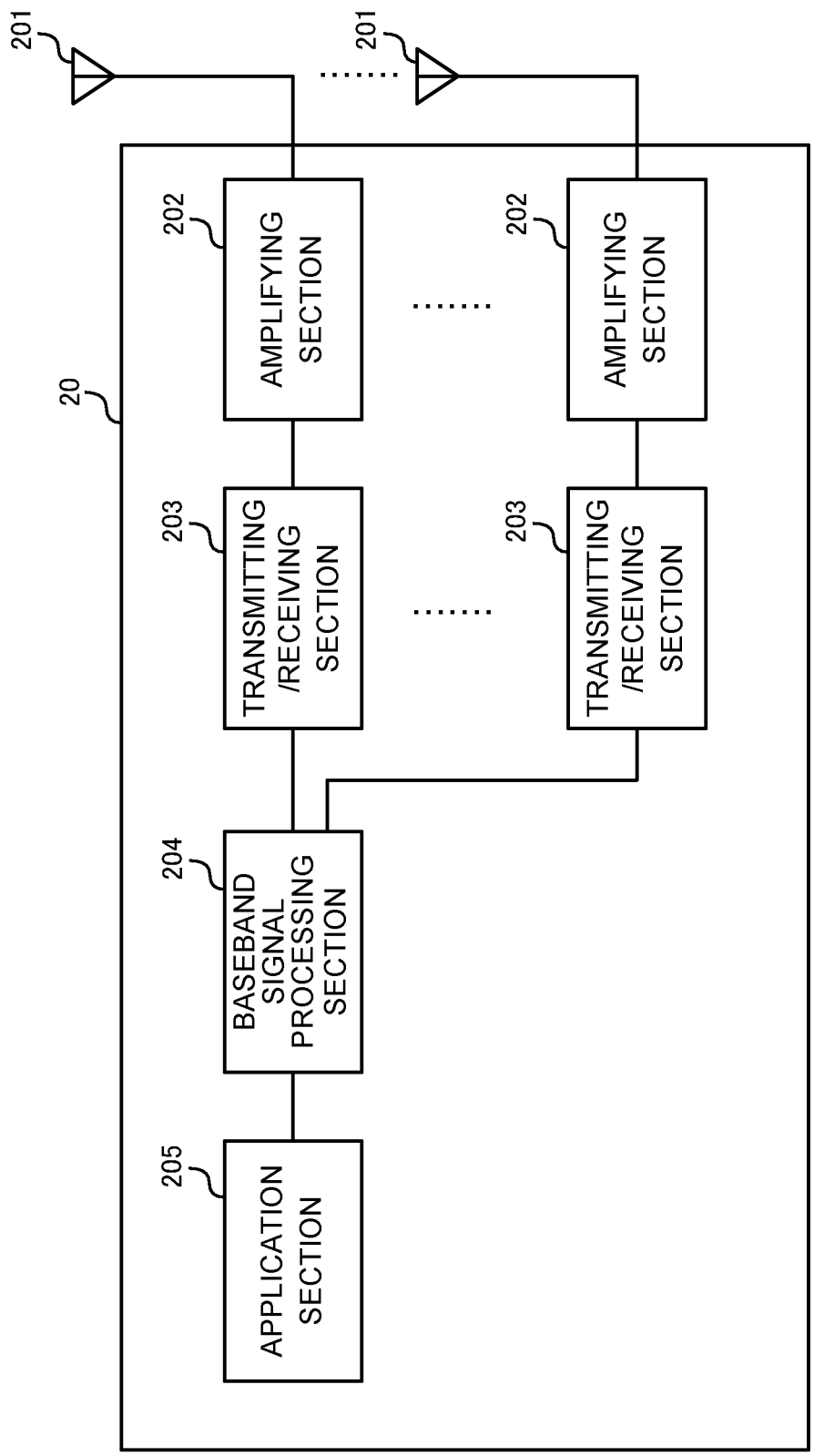
FIG. 16 is a diagram to show an example of an overall structure of a user terminal according to present embodiment.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals (for example, the synchronization signals or the broadcast signal) amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive information related to numerologies for use in communication. For example, the transmitting/receiving sections 203 receive information (for example, communication parameters) related to predetermined numerologies for use in communication, in an implicit and/or an explicit manner.

Figure 17:
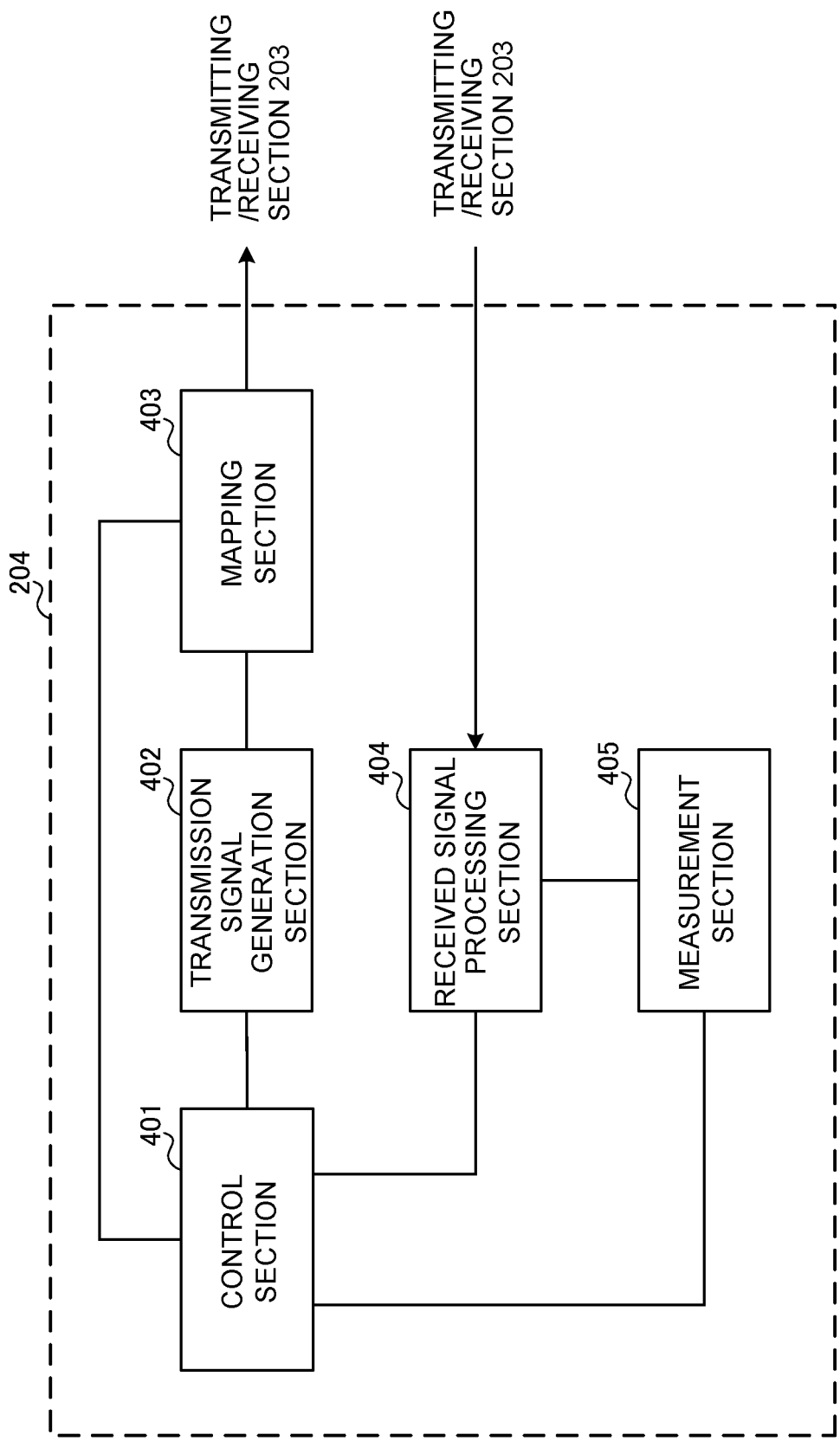
FIG. 17 is a diagram to show an example of a functional structure of a user terminal according to the present embodiment.

FIG. 17 is a diagram to show an example of a functional structure of a user terminal according to one embodiment of the present invention. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

To be more specific, the control section 401 controls the user terminal 20 to communicate by using a predetermined radio access scheme (for example, LTE RAT, 5G RAT, and so on). The control section 401 specifies the numerology that applies to the radio access scheme used for communication, and controls the transmission and receipt of signals in accordance with the numerology.

The control section 401 controls communication using at least one of a plurality of numerologies having different subcarrier spacing. These multiple numerologies can be configured so that the subcarrier spacing varies and either the length of transmission time intervals (TTIs) or the number of symbols per TTI varies.

The control section 401 may control communication based on transport block size tables and/or reference signal arrangements, which are defined for each one of a plurality of numerologies (see FIG. 12A). Alternatively, the control section 401 may determine the transport block size and/or the reference signal arrangement for a numerology to use in communication, from a reference transport block size table and/or a reference signal arrangement (see FIG. 12B).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received signal strength (for example, RSSI), the received quality (for example, RSRQ), the channel state and so on, of the received signal. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 18:
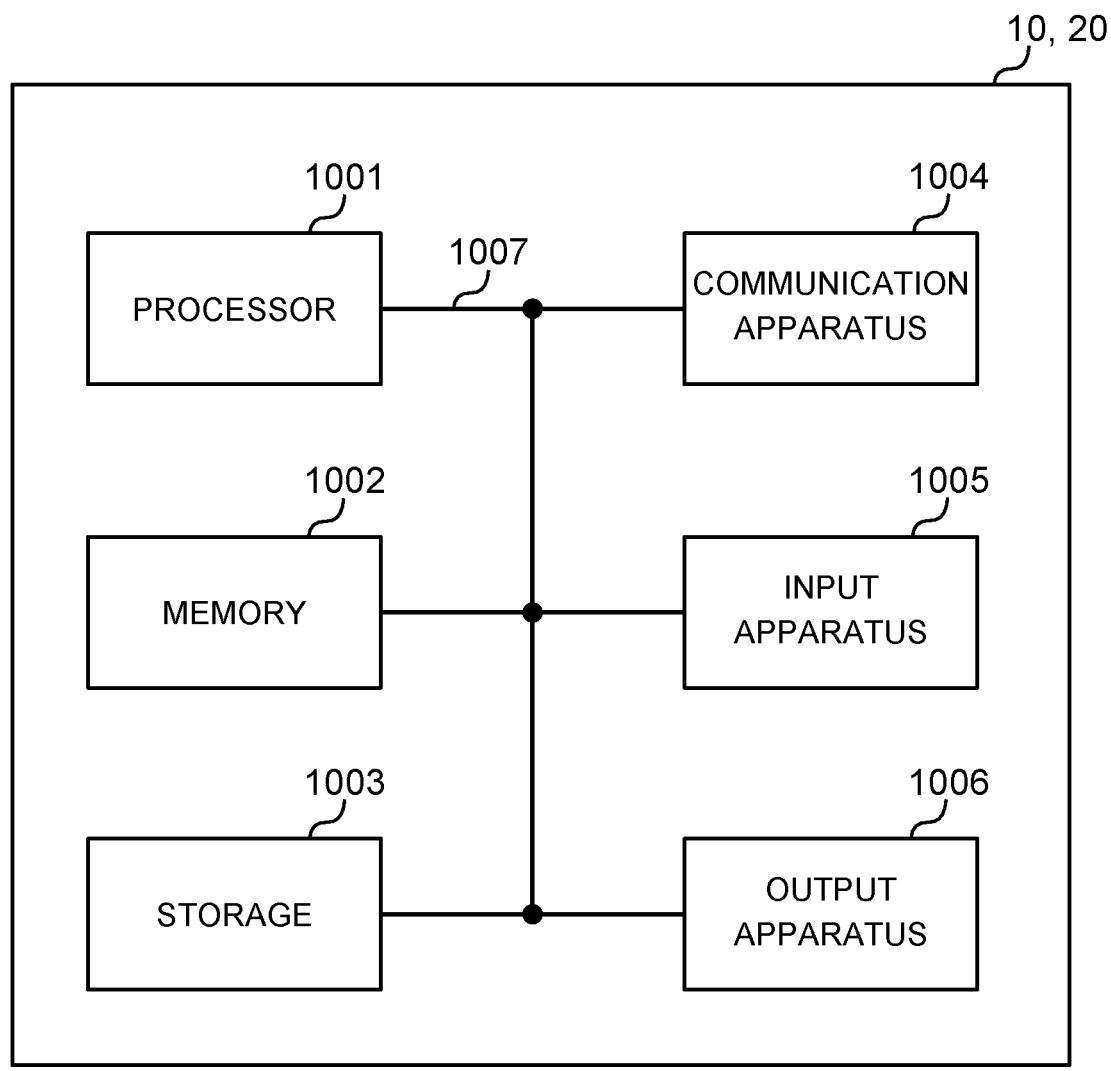
FIG. 18 is a diagram to show an example of a hardware structure of a radio base station and a user terminal according to one embodiment of the present invention.

That is, a radio base station, a user terminal and so on according to one embodiment of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier (CC)" may be referred to as a "cell," a "frequency carrier," a "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be composed of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol length and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information), UCI (Uplink Control Information)), higher layer signaling (for example, RRC (Radio Resource Control) signaling, broadcast information (the MIB (Master Information Block) and SIBs (System Information Blocks) and so on) and MAC (Medium Access Control) signaling, other signals or combinations of these. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), new RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-062597, filed on Mar. 25, 2016, including the specification, drawings and abstract, is incorporated herein by reference in its entirety.

The invention claimed is:

1. A terminal comprising:
   a processor that performs communications by using the same number of symbols per slot, the same number of subcarriers per Physical Resource Block (PRB) and at least one of subcarrier spacings; and
   a receiver that receives information regarding the subcarrier spacing.

2. The terminal according to claim 1, wherein when an extended cyclic prefix is applied to a communication by using the at least one of subcarrier spacings a number of symbols per slot is different between the communication to which a normal cyclic prefix is applied and the communication to which the extended cyclic prefix is applied.

3. A terminal comprising:
   a processor that performs communications by using a different number of symbols per 1 ms, the same number of subcarriers per Physical Resource Block (PRB) and at least one of subcarrier spacings; and
   a receiver that receives information regarding the subcarrier spacing.

4. The terminal according to claim 3, wherein a number of slots per 1 ms differs depending on the subcarrier spacing.

5. The terminal according to claim 4, wherein when an extended cyclic prefix is applied to a communication by using the at least one of subcarrier spacings a number of symbols per slot is different between the communication to which a normal cyclic prefix is applied and the communication to which the extended cyclic prefix is applied.

6. The terminal according to claim 3, wherein when an extended cyclic prefix is applied to a communication by using the at least one of subcarrier spacings a number of symbols per slot is different between the communication to which a normal cyclic prefix is applied and the communication to which the extended cyclic prefix is applied.

7. A radio communication method for a terminal comprising:
   performing communications by using the same number of symbols per slot, the same number of subcarriers per Physical Resource Block (PRB) and at least one of subcarrier spacings; and
   receiving information regarding the subcarrier spacing.

8. A radio communication method for a terminal comprising:
   performing communications by using a different number of symbols per 1 ms, the same number of subcarriers per Physical Resource Block (PRB) and at least one of subcarrier spacings; and
   receiving information regarding the subcarrier spacing.

* * * * *